United States Patent [19]
Nayebi et al.

[11] Patent Number: 6,008,864
[45] Date of Patent: Dec. 28, 1999

[54] COMPOSITE VIDEO SIGNAL BACKPORCH SOFT-CLAMP SYSTEM USING SERVO LOOP

[75] Inventors: Mehrdad Nayebi, Palo Alto; Duc Ngo, Jan Jose, both of Calif.

[73] Assignees: Sony Corporation, Tokyo, Japan; Sony Electronics, Inc., Park Ridge, N.J.

[21] Appl. No.: 08/585,298

[22] Filed: Jan. 11, 1996

Related U.S. Application Data

[60] Provisional application No. 60/000,372, Jun. 21, 1995.

[51] Int. Cl.$^6$ ....................................................... H04N 5/16
[52] U.S. Cl. ............................ 348/695; 348/696; 348/697
[58] Field of Search ..................................... 348/687, 688, 348/689, 691, 692, 695, 696, 697, 698

[56] References Cited

U.S. PATENT DOCUMENTS

| | | | |
|---|---|---|---|
| 3,980,816 | 9/1976 | Niimura | 178/7.3 R |
| 4,198,650 | 4/1980 | Hongu et al. | 358/8 |
| 4,263,610 | 4/1981 | Shanlet, II et al. | 348/506 |
| 4,335,397 | 6/1982 | Tamura | 358/29 |
| 4,340,903 | 7/1982 | Tamura | 358/10 |
| 4,942,314 | 7/1990 | Hosoya et al. | 348/506 |
| 5,087,966 | 2/1992 | Harradine | 358/27 |
| 5,140,421 | 8/1992 | Sumiyoushi | 348/695 |
| 5,280,356 | 1/1994 | Hiramatsu et al. | 348/695 |
| 5,325,187 | 6/1994 | Kubo et al. | 348/695 |

*Primary Examiner*—Nathan Flynn
*Attorney, Agent, or Firm*—Haverstock & Owens LLP

[57] ABSTRACT

A backporch soft-clamp circuit using a servo loop clamps the blank or DC level of a composite video signal to a known value without altering the other components of the signal. The values of the components of the composite video signal are determined by determining their amplitude with respect to the blank level. The backporch soft-clamp circuit sets the blank level to a known value for determining the true value of the components. An output composite video signal is generated which represents the input composite video signal with the blank or pedestal level set to a known DC level. Preferably, the DC level is set to two volts. A burst gate pulse representing the presence of a burst signal within the composite video signal is received by the circuit. During the burst period, the circuit soft clamps the blank level of the output signal to the appropriate level without altering the content of the burst signal. The DC level of the output signal is compared to the appropriate level by a comparator circuit. During the burst period, if the DC level of the output signal is less than the appropriate level, it is raised by a charging circuit. During the burst period, if the DC level of the output signal is greater than the appropriate level, it is lowered by a discharging circuit. During non-burst periods, when the burst signal is not present within the composite video signal, the charging and discharging circuits are disabled and the DC level of the output signal is maintained at a constant level.

19 Claims, 4 Drawing Sheets

COMPOSITE VIDEO SIGNAL BACKPORCH SOFT-CLAMP SYSTEM USING SERVO LOOP

RELATED APPLICATIONS

This application claims priority under 35 U.S.C. § 119(e) of the co-pending U.S. provisional application Ser. No. 60/000,372 filed on Jun. 21, 1995 and entitled "A Back Porch Soft Clamp Circuit Using Servo Loop." The provisional application Ser. No. 60/000,372 filed on Jun. 21, 1995 and entitled "A Back Porch Soft Clamp Circuit Using Servo Loop" is also hereby incorporated by reference.

FIELD OF THE INVENTION

The present invention relates to the field of clamping a DC level of a composite video signal. In particular, the present invention relates to the field of clamping the DC level of a composite video signal to a known constant level while preserving the information within the composite video signal.

BACKGROUND OF THE INVENTION

A composite color video signal includes horizontal synchronizing signals, a burst signal superimposed onto the pedestal level at the back porch of the horizontal synchronizing signal and a video information signal. The video information signal comprises a chrominance subcarrier having different phases amplitude-modulated with chrominance information. The composite color video signal includes both luminance and chrominance information.

Separator circuits are utilized to separate the horizontal synchronizing signal and the burst signal from the incoming composite video signal. The burst signal has a burst signal frequency equal to 3.58 MHz, which is the frequency of the chrominance subcarrier $f_{SC}$. When separating the burst signal from the composite video signal it is necessary for the separator circuitry to determine when the burst signal is present on the incoming composite video signal.

In many video transmission systems, color or chrominance information is represented by a particular phase of the chrominance subcarrier signal that is amplitude modulated with color information. Since the phase of the color subcarrier signal is used to represent color information, it is important that, when digitally encoding the color video signal, the phase of the sampling pulses is accurately controlled. Undesired phase shifts, such as may be due to temperature drift, aging of the electrical components, and the like, may result in a phase error in the sampling pulse relative to the chrominance subcarrier signal which has the effect of distorting or interfering with the overall chrominance effect of the video picture which ultimately is reproduced from the digitally encoded video signal.

To identify the aforementioned phase shifts between the sampling pulses and the chrominance subcarrier signal, the instantaneous phase angle of the burst signal at the time of sampling is determined. If the phase angle of the burst signal differs from a desired phase angle, the phase of the sampling pulses may be adjusted accordingly. If the phase angle of the burst signal is different than an expected phase angle, the phase difference between the modulated chrominance information and the signal will also be in error, thereby causing distortion of the color within an output video signal.

It is therefore important to the operation of the video transmission system that the burst signal is separated correctly from the composite video signal in order that the phase of the burst signal can be compared to the phase of a reference signal. Any error in separating the burst signal from the input composite video signal may result in an error determining the phase difference between the two signals and will cause the output video signal to be in error.

Within the composite video signal the values of the components are determined by their relative amplitude with respect to the blank or pedestal level. It is therefore essential that the blank or pedestal level is maintained at a known level so that the value of the component of the composite video signal can be readily determined. In the past, the blank level has been set to a known DC level allowing the values of the components of the composite video signal to be determined by determining their amplitude with respect to the blank level. However, care must be taken when setting the blank level to a specific value that the remainder of the composite video signal is not altered. Video systems of the prior art, in order to set the blank level to a known value, would separate the chrominance and luminance information from the composite video signal and then hard-clamp the blank level of the composite video signal to the appropriate level. Such a system is disadvantageous because at least two additional pins on the integrated circuit and external components are required within the system. What is needed is a system which does not require additional pins and external components and can set the blank level of the composite video signal to an appropriate level without altering the composite video signal.

SUMMARY OF THE INVENTION

A backporch soft-clamp circuit using a servo loop clamps the blank or DC level of a composite video signal to a known value without altering the other components of the signal. The values of the components of the composite video signal are determined by determining their amplitude with respect to the blank level. The backporch soft-clamp circuit sets the blank level to a known value for determining the true value of the components. An output composite video signal is generated which represents the input composite video signal with the blank or pedestal level set to a known DC level. Preferably, the DC level is set to two volts. A burst gate pulse representing the presence of a burst signal within the composite video signal is received by the circuit. During the burst period, the circuit soft clamps the blank level of the output signal to the appropriate level without altering the content of the burst signal. The DC level of the output signal is compared to the appropriate level by a comparator circuit. During the burst period, if the DC level of the output signal is less than the appropriate level, it is raised by a charging circuit. During the burst period, if the DC level of the output signal is greater than the appropriate level, it is lowered by a discharging circuit. During non-burst periods, when the burst signal is not present within the composite video signal, the charging and discharging circuits are disabled and the DC level of the output signal is maintained at a constant level.

DETAILED DESCRIPTION OF THE PREFERRED EMBODIMENT

A backporch soft-clamp circuit using a servo loop clamps the blank level of the composite video signal to a known value without altering the other components of the composite video signal. Within a composite video signal, each period includes a horizontal synchronization pulse, a burst signal and a video information signal. The values of the components of the composite video signal are determined by determining the difference in their amplitude and the blank level of the signal. The backporch soft-clamp circuit of the present invention sets the blank level of the composite video signal to a known level so that the true value of the components of the composite video signal may be determined. An output composite video signal is generated by the backporch soft-clamp circuit of the present invention which represents the input composite video signal with the blank or pedestal level set to a known DC level. In the preferred embodiment of the present invention, the blank level is set to a level equal to two volts. The output composite video signal is then used by other circuitry within the video system which separates the components of the composite video signal and determines the content of the composite video signal. A burst gate pulse representing the presence of the burst signal within the input composite video signal is provided to the backporch soft-clamp circuit. During the period when the burst gate pulse is active and the burst signal is present within the input composite video signal, the backporch soft-clamp circuit soft clamps the blank level of the input composite video signal to the appropriate level without altering the burst signal. Once the blank level of the input composite video signal is clamped to the appropriate level it will remain there throughout the non-burst period of the composite video signal.

Figure 1A:
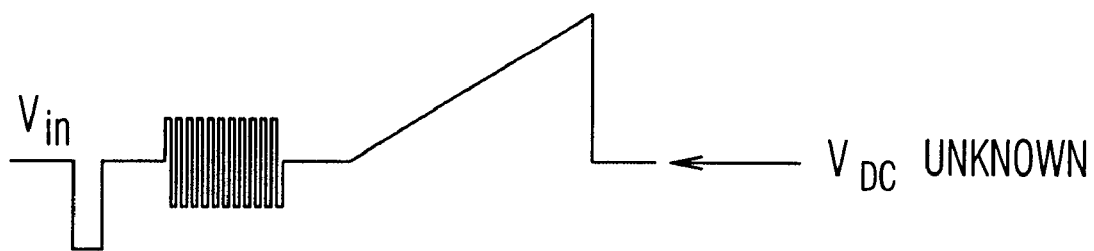
FIG. 1a illustrates a waveform of an input composite video signal Vin.
Figure 1B:
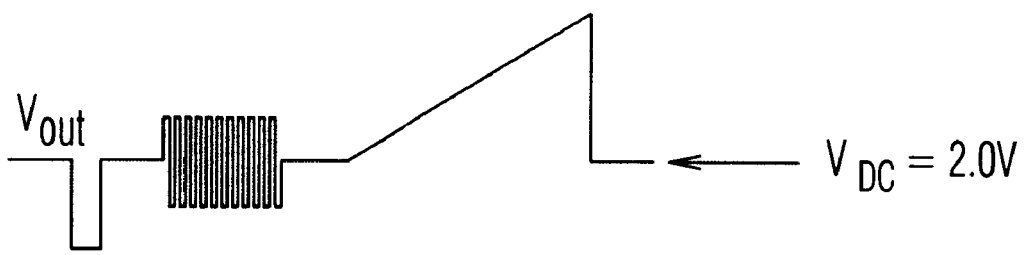
FIG. 1b illustrates a waveform of an output composite video signal Vout generated by the backporch soft-clamp circuit of the present invention.

An input composite video signal Vin with an unknown blank level is illustrated in FIG. 1a. An output composite video signal Vout generated by the backporch soft-clamp system of the present invention with a blank level set to 2 volts is illustrated in FIG. 1b. The output composite video signal Vout is an exact representation of the input composite video signal Vin except that the DC level of the signal is set to a level equal to 2 volts.

Figure 2:
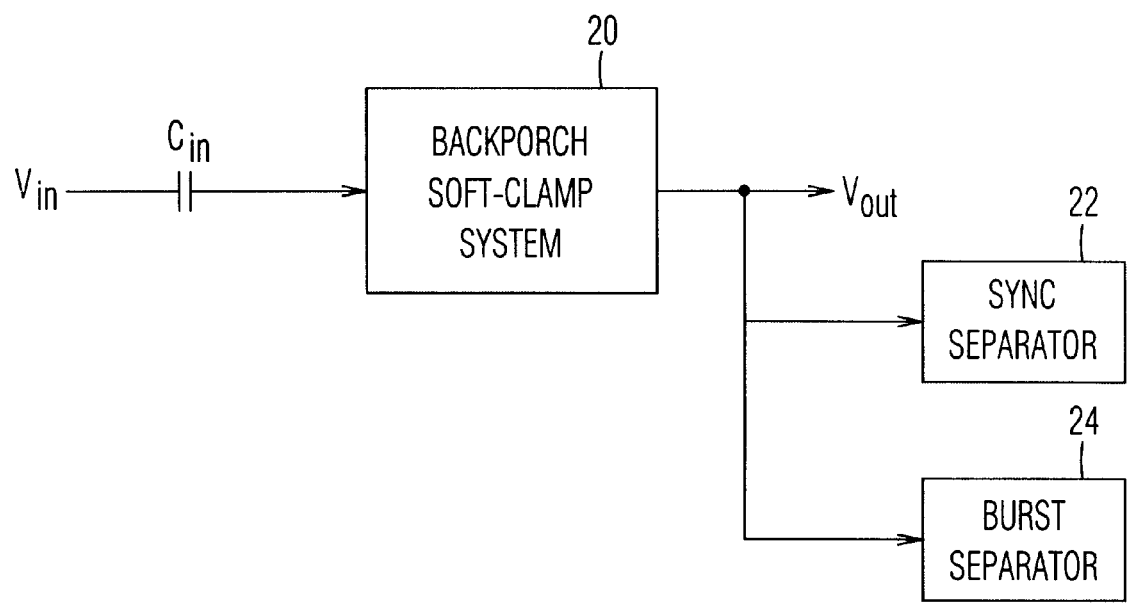
FIG. 2 illustrates a schematic block diagram of portions of a video system including the backporch soft-clamp circuit of the present invention.

A schematic block diagram of portions of a video system is illustrated in FIG. 2. The input composite video signal Vin is input to the backporch soft-clamp system 20 of the present invention through an input capacitor Cin. The backporch soft-clamp system 20 clamps the blank or DC level of the composite video signal to 2 volts and generates the output composite video signal Vout. The output composite video signal Vout from the backporch soft-clamp system 20 is provided to other components of the video system including a sync separator circuit 22 and a burst separator circuit 24.

Figure 3:
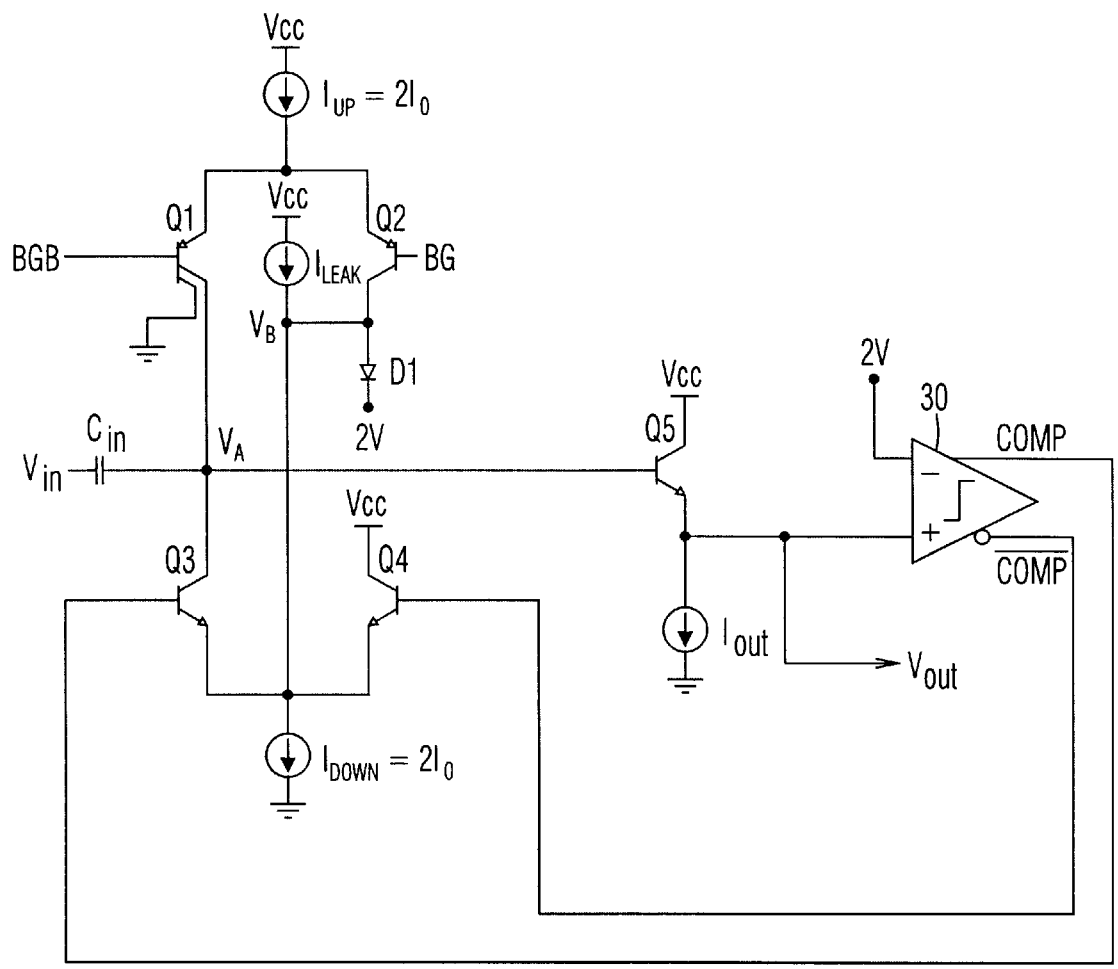
FIG. 3 illustrates a detailed schematic diagram of the backporch soft-clamp circuit of the present invention.

A detailed schematic diagram of the backporch soft-clamp circuit 20 of the present invention is illustrated in FIG. 3. A burst gate signal BG and inverse burst gate signal BGB are provided to the backporch soft-clamp circuit 20. The burst gate signal BG is active only when the burst signal is present within the input composite video signal Vin. The inverse burst gate signal BGB is the inverse of the burst gate signal BG. The input composite video signal Vin is coupled to the first terminal of a capacitor Cin. The burst gate signal BG is coupled to the base of a pnp transistor Q2. The inverse burst gate signal BGB is coupled to the base of a pnp transistor Q1. The emitter of the transistor Q1 is coupled to the emitter of the transistor Q2 and to the first terminal of a current source IUp. The second terminal of the current source IUp is coupled to a supply voltage VCC. The first collector of the transistor Q1 is coupled to ground. The second collector of the transistor Q1 is coupled to the second terminal of the capacitor Cin, to the base of an npn transistor Q5 and to the collector of an npn transistor Q3, thereby forming a voltage node VA.

The collector of the transistor Q2 is coupled to the anode of a diode D1, to the first terminal of a current source ILeak, to the emitter of the transistor Q3, to the emitter of an npn transistor Q4 and to the first terminal of a current source IDown, thereby forming a voltage node VB. The second terminal of the current source ILeak is coupled to the supply voltage VCC. The second terminal of the current source IDown is coupled to ground. The cathode of the diode D1 is coupled to a constant DC voltage signal having a value equal to 2 volts. The collector of the transistor Q4 is coupled to the supply voltage VCC.

The collector of the transistor Q5 is coupled to the supply voltage VCC. The emitter of the transistor Q5 is coupled to the first terminal of a current source IOut and to the positive input of a comparator 30, thereby providing an output voltage node from which the output composite video signal Vout is generated. The second terminal of the current source IOut is coupled to ground. A constant DC voltage signal having a value equal to 2 volts is coupled to the negative input of the comparator 30. The output Comp of the comparator 30 is coupled to the base of the transistor Q3. The inverse output $\overline{\text{Comp}}$ of the comparator 30 is coupled to the base of the transistor Q4. The inverse output $\overline{\text{Comp}}$ is designed to be the inverse of the output Comp of the comparator 30. The comparator 30 compares the output voltage signal Vout to the constant two volt DC voltage signal. If the output voltage signal Vout is greater than the constant two volt DC voltage signal then the output Comp is raised to a logical high voltage level and the inverse output $\overline{\text{Comp}}$ is lowered to a logical low voltage level. If the output voltage signal Vout is less than the constant two volt DC voltage signal then the output Comp is lowered to a logical low voltage level and the inverse output $\overline{\text{Comp}}$ is raised to a logical high voltage level.

The backporch soft-clamp circuit of the present invention clamps the blank level of the input composite video signal Vin to a level of equal to two volts, during the period when the burst signal is present within the input composite video signal Vin, without altering the remainder of the input composite video signal Vin. The burst gate signal BG is active when the burst signal is present within the input composite video signal Vin. Correspondingly, the inverse burst gate signal BGB is active when the burst signal is not present within the input composite video signal Vin.

In operation, during the burst period, when the burst gate signal BG is at a logical high voltage level and the inverse burst gate signal BGB is at a logical low voltage level, the transistor Q1 turns on and begins to raise the voltage level at the voltage node VA. During the burst period, the DC level of the output composite video signal Vout will be equal to the voltage level at the voltage node VA minus the base to emitter voltage of the transistor Q5. As long as the DC level of the output composite video signal Vout is less than two volts, the output Comp of the comparator 30 will be at a logical low voltage level and the inverse output $\overline{\text{Comp}}$ of the comparator 30 will be at a logical high voltage level. As a result, the tail current of the differential pair made up of the transistors Q3 and Q4 will flow through the transistor Q4. Therefore, during this time when the output Comp of the comparator 30 is at a logical low voltage level, the voltage node VA will have no discharge path. Without a discharge path, the voltage level at the node VA, and correspondingly the voltage level at the output node Vout, will get charged up and raised by the transistor Q1 until the DC level of the output composite video signal Vout becomes greater than two volts. When the DC level of the output composite video signal Vout becomes greater than two volts, the output Comp of the comparator 30 rises to a logical high voltage level and the inverse output $\overline{\text{Comp}}$ of the comparator 30 falls to a logical low voltage level. This causes the tail current of the differential pair made up of the transistors Q3 and Q4 to flow through the transistor Q3, thereby providing a discharge path for the voltage node VA. When the output signal Vout is not being charged up through the voltage node VA and the transistor Q5, the output node where the output composite video signal Vout is provided, will discharge through the current source Iout. When the voltage level at the voltage node VA drops below a voltage level equal to two volts plus the base to emitter voltage of the transistor Q5, causing the DC level of the output composite video signal Vout to drop below two volts, the output Comp of the comparator 30 will fall to a logical low voltage level and take away the discharge path of the voltage node VA. The voltage node VA and the output signal Vout are then charged up through the transistor Q1 until the DC voltage of the output composite video signal Vout is raised to above two volts again.

In this manner, during the burst period, when the burst gate pulse BG is at a logical high voltage level and the inverse burst gate pulse BGB is at a logical low voltage level, the backporch soft-clamp circuit of the present invention clamps the DC voltage level of the output composite video signal Vout to a level equal to two volts. If the DC voltage level of the output composite video signal Vout is below the two volt level then it is charged up through the transistor Q1, the voltage node VA and the transistor Q5. If the DC voltage level of the output composite video signal Vout is above the two volt level then it is discharged through the current source Iout. The charging and discharging of the DC voltage level of the output composite video signal Vout are controlled by the output Comp and inverse output $\overline{\text{Comp}}$ of the comparator 30. The outputs Comp and $\overline{\text{Comp}}$ of the comparator 30 are provided to control the transistors Q3 and Q4 through a feedback loop. The transistors Q3 and Q4 form a differential pair and either provide or block the discharge path of the voltage node VA, as controlled by the outputs Comp and $\overline{\text{Comp}}$ of the comparator 30.

During the non-burst periods of the input composite video signal Vin, the burst gate signal BG is at a logical low voltage level and the inverse burst gate signal BGB is at a logical high voltage level. When the inverse burst gate signal BGB is at a logical high voltage level, the transistor Q1 is turned off and the pull-up path of the voltage node VA is therefore disabled. When the burst gate signal BG is at a logical low voltage level, the transistor Q2 is turned on and the current from the current source IUp will flow through the transistor Q2. This current flows through the voltage node VB and results in no net tail current for the differential pair made up of the transistors Q3 and Q4, because the current source IUp provides the equal amount of current necessary to source the current source IDown. Accordingly, there will be no tail current flowing through either of the transistors Q3 and Q4. Because there is no tail current flowing through the transistors Q3 and Q4, the discharge path of the voltage node VA is disabled during a non-burst period. As a result, the transistors Q1 and Q3 effectively provide an open circuit from the perspective of the voltage node VA. The DC level of the voltage node VA is therefore effectively clamped to whatever it was at the end of the burst period because it will not be charged or discharged. During the non-burst period, because the transistor Q1 is off and the transistor Q3 is disabled, the input composite video signal Vin is passed through the backporch soft-clamp circuit to the output node Vout. However, because there is no discharge path for the voltage node VA, the DC level of the output composite video signal Vout is also clamped to a constant level during the non-burst period.

Also, during the non-burst period the diode D1 clamps the voltage level at the voltage node VB and will not allow it to rise above a level equal to two volts plus the voltage across the diode D1. Thus, the voltage level at the voltage node VB is clamped to a level below 2.7 volts. This will improve the turn on delay of the differential pair made up of the transistors Q3 and Q4. The current source ILeak also provides additional current to the differential pair at the emitters of the transistors Q3 and Q4 which raises the voltage of the voltage node VB above the base voltage of the transistors Q3 and Q4 to guarantee that the differential pair will be completely disabled.

When the next burst period begins, the burst gate signal BG will rise to a logical high voltage level and the inverse burst gate signal BGB will fall to a logical low voltage level, turning off the transistor Q2 and turning on the transistor Q1. During this burst period, the voltage node VA and the output voltage signal Vout will be charged up and discharged by the transistor Q1 and the transistor Q3, as controlled by the outputs Comp and $\overline{\text{Comp}}$ of the comparator 30.

The backporch soft-clamp circuit of the present invention clamps the DC voltage level of the output composite video signal Vout to a level equal to two volts during the burst period. The backporch soft-clamp circuit charges up the DC level of the output voltage Vout through the transistor Q1, the voltage node VA and the transistor Q5. The DC level of the output voltage Vout is discharged through the current source Iout. The charging and discharging of the DC level of the output voltage Vout are controlled by the comparator 30 which compares the DC level of the output voltage Vout to a constant voltage equal to two volts. During the non-burst period, the discharging path of the charging voltage node VA is disabled and the output composite video signal Vout will provide the input composite video signal Vin with a constant DC level equal to two volts. In this manner, the backporch soft-clamp circuit of the present invention provides the output composite video signal Vout which is identical to the input composite video signal Vin except that the DC level of the output composite video signal Vout is clamped to a level equal to two volts.

The output composite video signal Vout with a known DC level from the backporch soft-clamp circuit of the present invention is then provided to other circuitry within the video system. The other circuitry of the video system can then readily determine the video content of the output composite video signal Vout because of the known DC or pedestal level.

Figure 4:
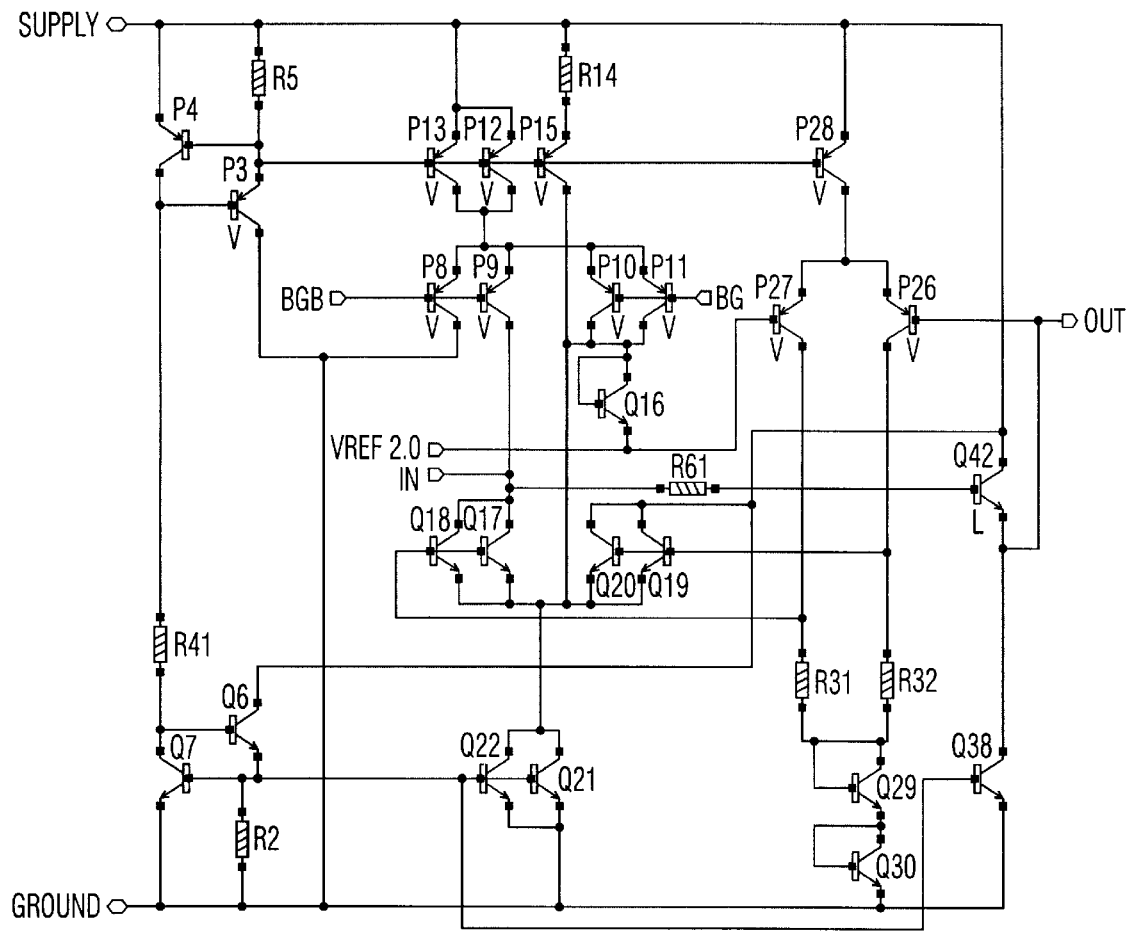
FIG. 4 illustrates a detailed schematic diagram of the preferred embodiment of the backporch soft-clamp circuit of the present invention.

A detailed circuit schematic of the preferred embodiment of the backporch soft-clamp circuit is illustrated in FIG. 4. The preferred embodiment of the present invention is implemented within a video/graphics overlay integrated circuit, Part No. CXA2015Q, which will be available from Sony Corporation of America, 3300 Zanker Road, San Jose, Calif. 95134.

While the preferred embodiment of the present invention has been illustrated and described as an integrated circuit using bipolar transistors, it will be apparent to a person of ordinary skill in the art that the circuit of the present invention may be implemented using another device technology, including but not limited to CMOS, MOS, discrete components and ECL. It will also be apparent to those skilled in the art that different logic circuit configurations could be substituted for the logic circuit described above to perform the functions of the preferred embodiment.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

We claim:

1. A method of clamping a DC level of an input composite video signal to a known level without altering content of the input composite video signal and further without separating portions of the input composite video signal, wherein each period of the input composite video signal includes a horizontal synchronization pulse, a burst signal and a video information signal, the method comprising the steps of:
   a. receiving the input composite video signal;
   b. generating an output composite video signal having a DC voltage level;
   c. raising the DC voltage level during the period the burst signal is present, if the DC voltage level is less than a predetermined value; and
   d. lowering the DC voltage level during the period the burst signal is present, if the DC voltage is greater than the predetermined value.

2. The method as claimed in claim 1 further comprising the step of comparing the DC voltage level to the predetermined value.

3. The method as claimed in claim 1 further comprising the step of receiving a burst gate pulse which is active during a burst period when the burst signal is present within the input composite video signal.

4. The method as claimed in claim 3 wherein the steps of raising and lowering are only performed when the burst gate pulse is active.

5. The method as claimed in claim 4 further comprising the step of comparing the DC voltage level to the predetermined value.

6. The method as claimed in claim 5 further comprising the step of maintaining the DC voltage level at a constant level during a non-burst period when the burst gate pulse is not active.

7. The method as claimed in claim 6 wherein the step of raising the DC voltage level is completed through a charging node which is also discharged during the step of lowering the DC voltage level.

8. The method as claimed in claim 7 wherein the step of maintaining the DC voltage level includes disabling a discharge path of the charging node.

9. A backporch soft-clamp apparatus for clamping a DC level of an input composite video signal to a known level without altering content of the input composite video signal and further without separating portions of the input composite video signal, wherein each period of the input composite video signal includes a horizontal synchronization pulse, a burst signal and a video information signal, the apparatus comprising:
   a. a first receiving circuit configured for receiving the input composite video signal;
   b. an output generation circuit coupled to the first receiving circuit for generating an output composite video signal having a DC voltage level, wherein the output composite video signal is a representation of the input composite video signal;
   c. a charging circuit coupled to the output generation circuit for raising the DC voltage level during the period the burst signal is present, if the DC voltage level is less than a predetermined value; and
   d. a discharging circuit coupled to the output generation circuit for lowering the DC voltage level during the period the burst signal is present, if the DC voltage level is greater than the predetermined value.

10. The backporch soft-clamp apparatus as claimed in claim 9 further comprising a comparator circuit coupled to the output generation circuit, the charging circuit and the discharging circuit for comparing the DC voltage level to the predetermined value and generating a charging control signal for controlling the charging circuit and a discharging control signal for controlling the discharging circuit.

11. The backporch soft-clamp apparatus as claimed in claim 10 further comprising a second receiving circuit configured for receiving a burst gate pulse which is active during a burst period when the burst signal is present within the input composite video signal.

12. The backporch soft-clamp apparatus as claimed in claim 11 further comprising a disabling circuit coupled to the second receiving circuit and to the charging and discharging circuits for disabling both the charging and discharging circuits when the burst gate pulse is not active.

13. A method of clamping a DC level of an input composite video signal to a known level without altering content of the input composite video signal and further without separating portions of the input composite video signal, wherein each period of the input composite video signal includes a horizontal synchronization pulse, a burst signal and a video information signal, the method comprising the steps of:
   a. receiving the input composite video signal;
   b. generating an output composite video signal having a DC voltage level;
   c. comparing the DC voltage level to a predetermined value;
   d. charging the DC voltage level during a burst period when the burst signal is present within the input composite video signal, if the DC voltage level is less than the predetermined value;
   e. discharging the DC voltage level during the burst period, if the DC voltage level is greater than the predetermined value; and
   f. maintaining the DC voltage level at a constant level during a non-burst period when the burst signal is not present within the input composite video signal.

14. The method as claimed in claim 13 further comprising the step of receiving a burst gate pulse which is active during the burst period when the burst signal is present within the input composite video signal.

15. The method as claimed in claim 14 wherein the step of charging the DC voltage level is completed through a charging node which is also discharged during the step of discharging the DC voltage level.

16. The method as claimed in claim 15 wherein the step of maintaining the DC voltage level includes the step of disabling a discharge path of the charging node.

17. The method as claimed in claim 16 wherein the predetermined value is equal to two volts.

18. A backporch soft-clamp apparatus for clamping a DC level of an input composite video signal to a known level without altering content of the input composite video signal and further without separating portions of the input composite video signal, wherein each period of the input composite video signal includes a horizontal synchronization pulse, a burst signal and a video information signal, the apparatus comprising:

a. a first receiving circuit configured for receiving the input composite video signal;

b. a second receiving circuit configured for receiving a burst gate pulse which is active during a burst period when the burst signal is present within the input composite video signal;

c. an output generation circuit coupled to the first receiving circuit for generating an output composite video signal having a DC voltage level, wherein the output composite video signal is a representation of the input composite video signal;

d. a comparator circuit coupled to the output generation circuit for comparing the DC voltage level to a predetermined value;

e. a charging circuit coupled to the output generation circuit and to the comparator circuit for raising the DC voltage level if the DC voltage level is less than the predetermined value;

f. a discharging circuit coupled to the output generation circuit and to the comparator circuit for lowering the DC voltage level if the DC voltage level is greater than the predetermined value; and g. a disabling circuit coupled to the second receiving circuit and to the charging and discharging circuits for disabling both the charging and discharging circuits when the burst gate pulse is not active.

19. The backporch soft-clamp apparatus as claimed in claim 18 wherein the predetermined value is equal to two volts.

* * * * *

UNITED STATES PATENT AND TRADEMARK OFFICE
CERTIFICATE OF CORRECTION

PATENT NO.   : 6,008,864

DATED        : December 28, 1999

INVENTOR(S)  : Mehrdad Nayebi, Duc Ngo

It is certified that error appears in the above-identified patent and that said Letters Patent is hereby correct as shown below:

In the Claims:

In column 7, line 33, please insert --in response to a burst gate pulse, which is active-- between "level" and "during".

In column 7, lines 35-36, please delete "during the period the burst signal is present," and insert --in response to the burst gate pulse,-- between "level" and "if".

In column 7, line 42, please delete "a" and insert --the-- between "receiving" and "burst".

In column 8, line 12, please insert --in response to a burst gate pulse, which is active-- between "level" and "during".

In column 8, lines 16-17, please delete "during the period the burst signal is present," and insert --in response to the burst gate pulse,-- between "level" and "if".

UNITED STATES PATENT AND TRADEMARK OFFICE
CERTIFICATE OF CORRECTION

PATENT NO. : 6,008,864
DATED : December 28, 1999
INVENTOR(S) : Mehrdad Nayebi, Duc Ngo It is certified that error appears in the above-identified patent and that said Letters Patent is hereby corrected as shown below:

In column 8, line 28, please delete "a" and insert --the-- between "receiving" and "burst".

Signed and Sealed this

Thirty-first Day of October, 2000

Attest:

Q. TODD DICKINSON

*Attesting Officer*　　　　*Director of Patents and Trademarks*